US008503824B2

(12) United States Patent
Kwon et al.

(10) Patent No.: US 8,503,824 B2
(45) Date of Patent: Aug. 6, 2013

(54) ROLLED FINGERPRINT ACQUISITION APPARATUS AND METHOD USING REGISTRATION AND SYNTHESIS

(75) Inventors: Dongjin Kwon, Seoul (KR); Bong Seop Song, Seoul (KR); Jae Won Lee, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 381 days.

(21) Appl. No.: 12/877,489

(22) Filed: Sep. 8, 2010

(65) Prior Publication Data

US 2011/0286686 A1 Nov. 24, 2011

(30) Foreign Application Priority Data

May 18, 2010 (KR) .................. 10-2010-0046573

(51) Int. Cl.
*G06K 9/36* (2006.01)
(52) U.S. Cl.
USPC ........................................................ 382/284
(58) Field of Classification Search
USPC .................. D14/384; 283/68, 78; 340/5.53, 340/83; 382/116, 124, 284; 396/15; 427/1
See application file for complete search history.

(56) References Cited

U.S. PATENT DOCUMENTS

| 5,493,621 | A  | * | 2/1996  | Matsumura ........... 382/125 |
| 6,400,836 | B2 | * | 6/2002  | Senior ................. 382/124 |
| 6,597,802 | B1 | * | 7/2003  | Bolle et al. ........... 382/124 |
| 2003/0091219 | A1 | * | 5/2003 | Martinez et al. ...... 382/124 |
| 2005/0169506 | A1 | * | 8/2005 | Fenrich et al. ....... 382/127 |
| 2007/0047785 | A1 | * | 3/2007 | Jang et al. ........... 382/125 |
| 2008/0013803 | A1 | * | 1/2008 | Lo et al. .............. 382/124 |
| 2008/0273770 | A1 | * | 11/2008 | Kohout ............... 382/125 |
| 2011/0064282 | A1 | * | 3/2011 | Abramovich et al. .. 382/124 |

FOREIGN PATENT DOCUMENTS

KR 10-2002-0065094 A 8/2002

* cited by examiner

*Primary Examiner* — Gregory F Cunningham
(74) *Attorney, Agent, or Firm* — NSIP Law

(57) ABSTRACT

Provided are a rolled fingerprint acquisition apparatus and method for accurately registering and synthesizing fingerprints. The rolled fingerprint acquisition apparatus selects a reference frame from among rolled fingerprint frames that are sequentially acquired, calculates the central locations of fingerprints included in the rolled fingerprint frames, sets an order in which the reference frame and rolled fingerprint frames are performed based on the central locations of the fingerprints, and registers and synthesizes the reference frame with the rolled fingerprint frames according to the set order.

22 Claims, 10 Drawing Sheets

ROLLED FINGERPRINT ACQUISITION APPARATUS AND METHOD USING REGISTRATION AND SYNTHESIS

CROSS-REFERENCE TO RELATED APPLICATION

This application claims the benefit under 35 U.S.C. §119(a) of a Korean Patent Application No. 10-2010-0046573, filed on May 18, 2010, the entire disclosure of which is incorporated herein by reference for all purposes.

BACKGROUND

1. Field

The following description relates to a technique of acquiring a fingerprint by registering and synthesizing rolled fingerprint frames.

2. Description of the Related Art

Recently, with an increase of information exchange through the Internet, demands for accuracy of personal authentication are increasing more and more. In order to meet the demands, authentication through biometrics is gradually extending.

In general, biometrics authentication includes certification through fingerprints, voices, images, electronic signatures, etc. Specifically, fingerprint certification occupies about 70% of a biometrics-related market since it requires contact with only a user's finger to ensure excellent convenience and allows a simple structure.

A fingerprint recognition system may be applied to small-sized digital devices, such as a laptop computer, a mobile phone, a PDA, etc., as well as a network security system.

In order to accurately acquire a fingerprint, a rolled fingerprint acquisition method has been widely used. When a user's finger contacts and rolls on a fingerprint acquisition apparatus, a conventional rolled fingerprint acquisition method acquires rolled fingerprint frames at regular time intervals, cuts out portions where the acquired rolled fingerprint frames overlap each other and then synthesizes the resultant fingerprint frames to acquire a final fingerprint.

However, the conventional rolled fingerprint acquisition method has a problem that while a fingerprint is acquired, important fingerprint-related information may be deleted. Therefore, studies into a method capable of accurately acquiring a fingerprint while avoiding deletion of important fingerprint-related information are actively being conducted.

SUMMARY

In one general aspect, there is provided a rolled fingerprint acquisition method using registration and synthesis, including: selecting a reference frame from among rolled fingerprint frames that are sequentially acquired; calculating central locations of fingerprints included in the rolled fingerprint frames; setting an order in which the reference frame and the rolled fingerprint frames are registered and synthesized, based on the calculated central locations of the fingerprints; and registering and synthesizing the reference frame and the rolled fingerprint frames according to the set order.

The calculating of the central locations of the fingerprints included in the rolled fingerprint frames may include setting the order in which the reference frame and the rolled fingerprint frames are registered and synthesized in such a manner as to register and synthesize a rolled fingerprint frame whose central location is closer to the central location of the reference frame earlier.

The setting of the order in which the reference frame and the rolled fingerprint frames are registered and synthesized may include: setting the order in which the reference frame and rolled fingerprint frames acquired before the reference frame is acquired among the rolled fingerprint frames are registered and synthesized, in such a manner as to register and synthesize a rolled fingerprint frame whose central location is closer to the central location of the reference frame earlier, among the rolled fingerprint frames; and setting the order in which the reference frame and rolled fingerprint frames acquired after the reference frame is acquired among the rolled fingerprint frames are registered and synthesized, in such a manner as to register and synthesize a rolled fingerprint frame whose central location is closer to the central location of the reference frame earlier, among the rolled fingerprint frames.

In one general aspect, there is provided a rolled fingerprint acquisition apparatus including: a reference frame selector to select a reference frame from among rolled fingerprint frames; a central location calculator to calculate central locations of fingerprints included in the rolled fingerprint frames; a registration and synthesis order setting unit to set an order in which the reference frame and the rolled fingerprint frames are registered and synthesized based on the central locations of the fingerprints included in the rolled fingerprint frames; and a registration/synthesis unit to register and synthesize the reference frame and the rolled fingerprint frames according to the set order.

The reference frame selector may calculate a mean or median value of central locations of fingerprints included in the rolled fingerprint frames, and selects a rolled fingerprint frame whose central location corresponds to the mean value or is closest to the median value, as a reference frame, among the rolled fingerprint frames.

The registration and synthesis order setting unit may set the order in which the reference frame and the rolled fingerprint frames are registered and synthesized, in such a manner as to register and synthesize a rolled fingerprint frame whose central location is closer to the central location of the reference frame earlier, among the rolled fingerprint frames.

Other features and aspects will be apparent from the following detailed description, the drawings, and the claims.

Figure 1:
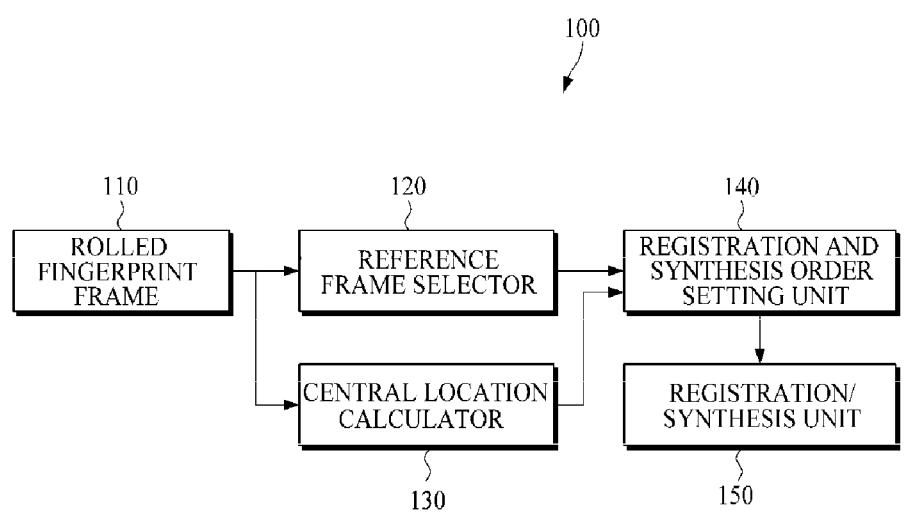
FIG. 1 is a diagram illustrating an example of a rolled fingerprint acquisition apparatus using registration and synthesis.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of a rolled fingerprint acquisition apparatus 100 using registration and synthesis.

Referring to FIG. 1, the rolled fingerprint acquisition apparatus 100 includes a rolled fingerprint frame acquisition unit 110, a reference frame selector 120, a central location calculator 130, a registration and synthesis order setting unit 140 and a registration/synthesis unit 150.

The rolled fingerprint frame acquisition unit 110 may include an optical-type, ultrasonic-type, or semiconductor-type sensor. That is, the rolled fingerprint frame acquisition unit 110 may acquire a user's fingerprint image through the optical-type, ultrasonic-type or semiconductor-type sensor. The rolled fingerprint frame acquisition unit 110 acquires rolled fingerprint frames at regular time intervals when the user's finger contacts and rolls thereon. For example, the rolled fingerprint frame acquisition unit 110 may acquire rolled fingerprint frames every 0.5 seconds. If the contact and rolling of the user's finger is terminated when 2 seconds elapse, a total of 4 rolled fingerprint frames will be acquired.

The reference frame selector 120 selects a reference frame from among rolled fingerprint frames that are sequentially acquired by the rolled fingerprint frame acquisition unit 110. For example, the reference frame selector 120 calculates a mean or median value of central locations of fingerprints included in the acquired rolled fingerprint frames, wherein the central locations may be represented as coordinate values and the mean or median value may be a value calculated from the coordinate values. The reference frame selector 120 may select, as a reference frame, a rolled fingerprint frame whose central location value is closest to the mean value. That is, the coordinate value of the central location of the reference frame may be closest to the mean value. The reference frame selector 120 may select, as a reference frame, a rolled fingerprint frame whose central location corresponds to the median value. That is, the coordinate value of the central location of the reference frame may be equal to the median value.

As another example, the reference frame selector 120 may select, as a reference frame, a rolled fingerprint frame in which the outline or ridges of a fingerprint have a symmetrical structure. That is, the reference frame selector 120 may select, as a reference frame, a rolled fingerprint frame in which the outline or ridges of a fingerprint have the most symmetrical structure.

As another example, the reference frame selector 120 may select, as a reference frame, a rolled fingerprint frame including a fingerprint having the shortest distance between a core and a central location.

As another example, the reference frame selector 120 may select, as a reference frame, a rolled fingerprint frame which is located in the middle of rolled fingerprint frames that are sequentially acquired. For example, when 5 rolled fingerprint frames are sequentially acquired, the reference frame selector 120 may select a third fingerprint frame as a reference frame.

As another example, the reference frame selector 120 may select a first or final rolled fingerprint frame as a reference frame.

However, the reference frame selector 120 may select a reference frame using other methods than the above-described methods.

Then, the central location calculator 130 may calculate the central locations of fingerprints included in the rolled fingerprint frames acquired by the rolled fingerprint frame acquisition unit 110.

For example, the central location calculator 130 extracts a foreground including a fingerprint and a background including no fingerprint from each rolled fingerprint frame. The following description will be provided under an assumption that a black color has a small intensity value and a white color has a great intensity value. Accordingly, the intensity value of a portion corresponding to a fingerprint will be small and the intensity value of the remaining portion will be great. However, it is also possible to set a black color to have a great intensity value and a white color to have a small intensity value. Then, the central location calculator 130 smoothes each rolled fingerprint frame, compares the intensity values of individual pixels with a threshold value and then classifies pixels whose intensity values are smaller than the threshold value to a foreground. As a result, a black portion of each rolled fingerprint frame may be extracted as a foreground. Meanwhile, the central location calculator 130 may extract pixels whose intensity values are greater than the threshold value as a background. That is, a white portion of each rolled fingerprint frame may be extracted as a background. Alternatively, the central location calculator 130 may divide each rolled fingerprint frame into a plurality of blocks and then calculate intensity variances of the blocks. Then, the central location calculator 130 may extract a foreground and a background using the intensity variances. For example, the central location calculator 130 may extract a block whose intensity variance is smaller than a threshold value, as a foreground. Meanwhile, the central location calculator 130 may extract a block whose intensity variance is greater than a threshold value, as a background. However, the central location calculator 130 may extract a foreground and a background using other methods than the above-described examples.

The central location calculator 130 calculates a center of mass for the extracted foreground and determines the calculated center of mass as a central location. The center of mass may be calculated by Equation 1 below.

$$cx = \frac{\sum_{px,py} w(px, py) \cdot px}{\sum_{px,py} w(px, py)}, cy = \frac{\sum_{px,py} w(px, py) \cdot py}{\sum_{px,py} w(px, py)}, \quad (1)$$

where cx is an x coordinate of the center of mass, cy is a y coordinate of the center of mass, px is an x coordinate of a pixel of the corresponding rolled fingerprint frame, py is a y coordinate of the pixel of the rolled fingerprint frame, and w(px, py) is a weight.

If (px, py) is a point on the foreground, w(px, py)=1, whereas if (px, py) is a point on the background, w(px, py)=0.

As another example, the central location calculator 130 may calculate the center of mass using Equations 1 and 2 or Equations 1 and 3 and determine the calculated center of mass as a central location. In this case, the central location calculator 130 needs not to extract a foreground or a background from the rolled fingerprint frame.

$$w(px,py)=255-I(px,py) \quad (2)$$

$$w(px,py)=1/(I(px,py)+1) \quad (3)$$

Here, $I(px,py)$ represents an intensity value of a pixel at a location of $(px, py)$.

Instead of Equations 2 and 3, various Equations to assign higher weights to pixels having darker colors may be used.

As another example, the central location calculator 130 extracts the outline of a fingerprint included in the rolled fingerprint frame and determines, as a central location, a point at which the middle line of the horizontal width of the outline meets the middle line of the vertical width of the outline.

However, the central location calculator 130 may obtain the central location using other methods than the above-described examples.

Then, the registration and synthesis order setting unit 140 may set an order in which registration and synthesis are performed between the reference frame and rolled fingerprint frames, based on central locations.

For example, the registration and synthesis order setting unit 140 may set an order in which registration and synthesis are performed between the reference frame and rolled fingerprint frames in a manner to register and synthesize a rolled fingerprint frame whose central location is closer to the central location of the reference frame earlier.

As another example, the registration and synthesis order setting unit 140 may set an order in which registration and synthesis are performed between the reference frame and rolled fingerprint frames acquired before the reference frame is acquired in a manner to register and synthesize a rolled fingerprint frame whose central location is closer to the central location of the reference frame earlier. Then, the registration and synthesis order setting unit 140 may set an order in which registration and synthesis are performed between the reference frame and rolled fingerprint frames acquired after the reference frame is acquired in a manner to register and synthesize a rolled fingerprint frame whose central location is closer to the central location of the reference frame earlier.

However, it is also possible that the registration and synthesis order setting unit 140 sets an order for registration and synthesis between the reference frame and rolled fingerprint frames acquired after the reference frame is acquired and then sets an order for registration and synthesis between the reference frame and rolled fingerprint frames acquired before the reference frame is acquired.

Successively, the registration/synthesis unit 150 may register the reference frame with the rolled fingerprint frames in the set order for registration and synthesis.

An example of a method for registration between the reference frame and rolled fingerprint frames is described below. First, the registration/synthesis unit 150 extracts foregrounds of the reference frame and rolled fingerprint frames. The registration/synthesis unit 150 correlates the reference frame with a rolled fingerprint frame to be registered with the reference frame and then extracts a region where a foreground of the reference frame overlaps a foreground of the rolled fingerprint frame. Then, the registration/synthesis unit 150 determines at least one control point from the overlapping region in the rolled fingerprint frame. The registration/synthesis unit 150 calculates a displacement from the control point on the rolled fingerprint frame to a point that is on the foreground of the reference frame and matches the control point. For example, the point on the foreground of the reference frame, matching the control point, may be identified based on the pixel intensity values of the corresponding fingerprint.

For example, the registration/synthesis unit 150 may calculate matching scores to which degrees of sameness or similarity between the control point and individual points on the reference frame are scored, and recognize a point having a greatest matching score as a point matching the control point. The matching scores may be calculated by comparing the control point with each point of the reference frame. Alternatively, the matching scores may be calculated by comparing the intensity value of a block including the control point with the intensity value of each block of the reference frame.

As another example, the registration/synthesis unit 150 may calculate displacements based on displacements calculated with respect to another control point. For example, the case where two points having a greatest matching score with respect to a first control point are found and displacements from the two points to the first control point are respectively "1" and "10" will be explained. In this case, if a displacement calculated with respect to a second control point is "2", the registration/synthesis unit 150 considers the displacement "2" as "1" that is closer to "2" between the displacements "1" and "10". In this way, errors of wrongly calculating displacements may be reduced.

The registration/synthesis unit 150 registers the rolled fingerprint frame with the reference frame based on the calculated displacements. For example, the registration/synthesis unit 150 may register the rolled fingerprint frame with the reference frame by moving all pixels of the rolled fingerprint frame based on the calculated displacements. At this time, the registration/synthesis unit 150 may determine values for moving the pixels by interpolating displacements of pixels adjacent to the pixels.

The registration/synthesis unit 150 may synthesize the resultant registered frame obtained by the registration with the reference frame or synthesize the synthesized frame with the registered frame. Here, the registered frame includes a registered fingerprint and the synthesized frame includes a synthesized fingerprint.

For example, the registration/synthesis unit 150 extracts a foreground of the reference frame and a foreground of a first-order rolled fingerprint frame. Then, the registration/synthesis unit 150 sets the intensity value of pixels in a region where the two foregrounds overlap to an intensity value having a darker color between the intensity values of pixels corresponding to the two foregrounds. For example, the registration/synthesis unit 150 compares the intensity values of pixels of the reference frame with the intensity values of pixels of the first-order rolled fingerprint frame, respectively. Then, the registration/synthesis unit 150 may set the intensity value of each pixel to an intensity value having a darker color according to the results of the comparison. The registration/synthesis unit 150 performs the above-described process on all pixels included in the overlapping region.

As another example, the registration/synthesis unit 150 may set a mean value between the intensity value of a pixel of the reference frame and the intensity value of the corresponding pixel of the first-order rolled fingerprint frame, to an intensity value of the corresponding pixel.

As another example, the registration/synthesis unit 150 may assign a weight to any one of the intensity value of a pixel of the reference frame and the intensity value of the corresponding pixel of the first-order rolled fingerprint frame to calculate an intensity value, and set the calculated intensity value to an intensity value of the corresponding pixel. For example, in the case of a pixel located close to the central location of the reference frame, a higher weight may be assigned to the pixel of the reference frame than the corresponding pixel of the first-order rolled fingerprint frame, or vice versa. Other than the above-described method, various methods of assigning weights to pixels may be applied to set the intensity values of pixels. The registration/synthesis unit 150 maintains the intensity values of pixels belonging to regions where the two foregrounds do not overlap.

The registration/synthesis unit 150 performs registration and synthesis according to the order for registration and synthesis set by the registration and synthesis order setting unit 140.

For example, the registration/synthesis unit 150 registers the reference frame with the first-order rolled fingerprint frame to create a first registered frame. Then, the registration/synthesis unit 150 synthesizes the reference frame with the first registered frame to create a first synthesized frame. Next, the registration/synthesis unit 150 registers the first synthesized frame with a second-order rolled fingerprint frame to create a second registered frame. Then, the registration/synthesis unit 150 synthesizes the first synthesized frame with the second registered frame to create a second synthesized frame. By repeating the process, the rolled fingerprint acquisition apparatus 100 may obtain a finally synthesized frame.

As another example, when there is a separate synthesized frame for synthesis, the registration/synthesis unit 150 inserts the reference frame into the synthesized frame. Then, the registration/synthesis unit 150 registers the synthesized frame with a first-order rolled fingerprint frame to create a first registered frame. Then, the registration/synthesis unit 150 synthesizes the synthesized frame with the first registered frame and inserts the resultant frame into the synthesized frame. Then, the registration/synthesis unit 150 registers the synthesized frame with a second-order rolled fingerprint frame to create a second registered frame. Successively, the registration/synthesis unit 150 synthesizes the synthesized frame with the second registered frame and inserts the resultant frame into the synthesized frame. By repeating the process, the rolled fingerprint acquisition apparatus 100 may obtain a finally synthesized frame.

Therefore, the rolled fingerprint acquisition apparatus 100 may acquire an accurate fingerprint by selecting a reference frame and performing registration and synthesis according to a predetermined order for registration and synthesis.

Also, the rolled fingerprint acquisition apparatus 100 may acquire a fingerprint whose upper and lower portions have no distortion by performing registration and synthesis between a reference frame and its adjacent rolled fingerprint frames.

Figure 2:
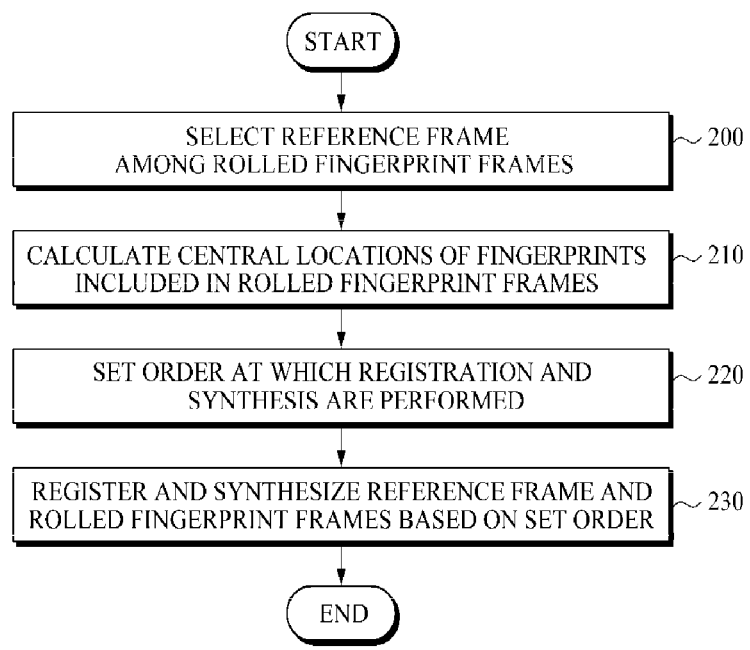
FIG. 2 is a flowchart illustrating an example of a rolled fingerprint acquisition method using registration and synthesis.

FIG. 2 is a flowchart illustrating an example of a rolled fingerprint acquisition method using registration and synthesis.

Referring to FIGS. 1 and 2, the rolled fingerprint acquisition apparatus 100 selects a reference frame from among rolled fingerprint frames that are sequentially acquired by the rolled fingerprint frame acquisition unit 110 (operation 200). For example, the rolled fingerprint acquisition apparatus 100 may select a reference frame using a mean or median value of the central locations of fingerprints included in rolled fingerprint frames that are sequentially acquired by the rolled fingerprint frame acquisition unit 110. As another example, the rolled fingerprint acquisition apparatus 100 may select a reference frame using the outline or ridges of a fingerprint. The rolled fingerprint acquisition apparatus 100 may select a reference frame using other methods than the above-described methods. The rolled fingerprint acquisition apparatus 100 calculates the central locations of fingerprints included in the rolled fingerprint frames (operation 210). Then, the rolled fingerprint acquisition apparatus 100 sets an order in which the reference frame and rolled fingerprint frames are registered and synthesized, based on the calculated central locations (operation 220). Successively, the rolled fingerprint acquisition apparatus 100 registers and synthesizes the reference frame and rolled fingerprint frames according to the order for registration and synthesis (operation 230). Detailed examples for the rolled fingerprint acquisition method will be described later with reference to FIGS. 3, 4, 5, 6, 7 and 8.

As another example, the rolled fingerprint acquisition apparatus 100 selects a first acquired rolled fingerprint frame as a reference frame. Then, the rolled fingerprint acquisition apparatus 100 sequentially registers and synthesizes the reference frame and rolled fingerprint frames acquired after the reference frame is acquired using the following method. The rolled fingerprint acquisition apparatus 100 may register and synthesize received rolled fingerprint frames in real time.

In detail, the fingerprint acquisition apparatus 100 may extract a foreground of the reference frame and a foreground of a rolled fingerprint frame to be registered with the reference frame, extract a region where the foreground of the reference frame overlaps the foreground of the rolled finger frame, set at least one control points in the overlapping region, calculate a displacement from the control point to a point of the reference frame matching the control point and register the rolled fingerprint frame with the reference frame based on the displacement. Thereafter, the rolled fingerprint acquisition apparatus 100 may synthesize the registered rolled fingerprint frame with the reference frame.

Figure 3:
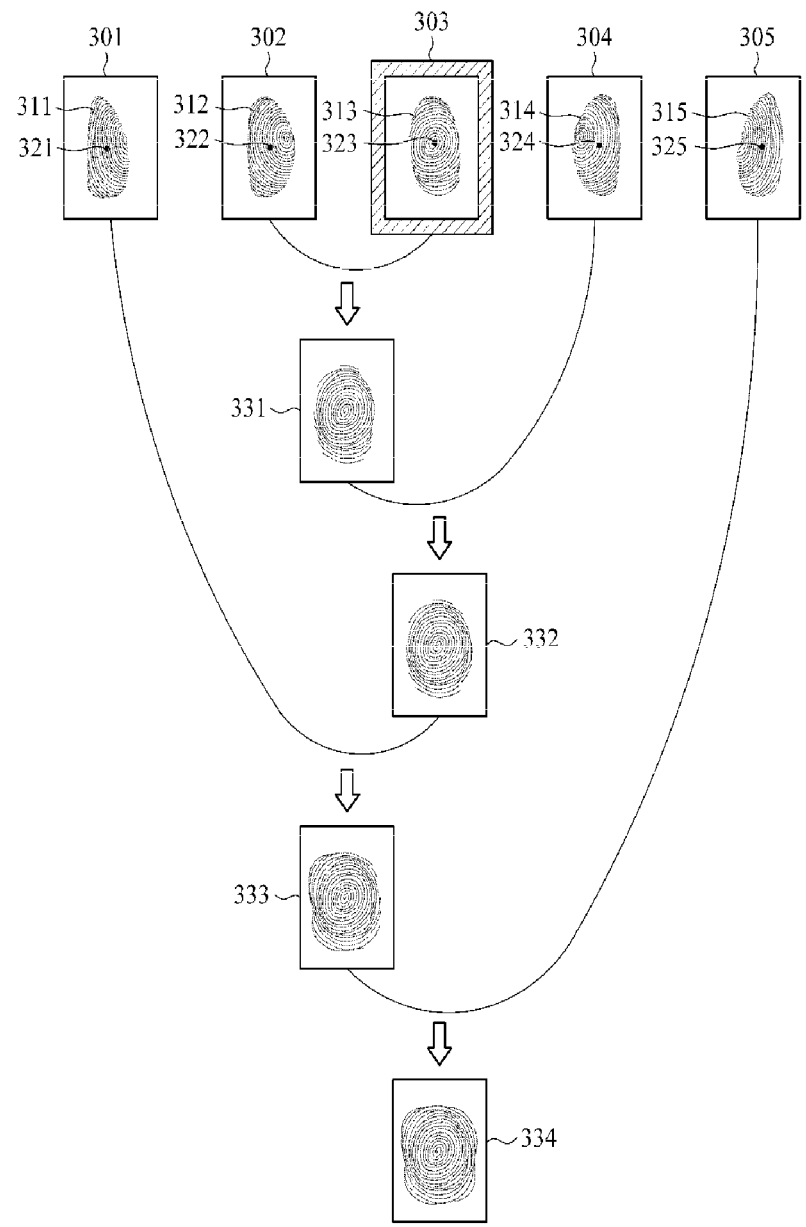
FIG. 3 is a view for explaining an example of the order in which registration and synthesis are performed.

FIG. 3 is a view for explaining an example of the order in which registration and synthesis are performed.

Referring to FIGS. 1 and 3, the rolled fingerprint acquisition apparatus 100 selects a reference frame 303 from among rolled fingerprint frames 301, 302, 303, 304 and 305 that are sequentially acquired by the rolled fingerprint frame acquisition unit 110. For example, the rolled fingerprint acquisition apparatus 100 may select a reference frame using a mean or median value of the central locations of fingerprints included in the rolled fingerprint frames. As another example, the rolled fingerprint acquisition apparatus 100 may select a reference frame using the outline or ridges of a fingerprint. However, the rolled fingerprint acquisition apparatus 100 may select a reference frame using other methods than the above-described methods.

Then, the rolled fingerprint acquisition apparatus 100 calculates the central locations 321, 322, 323, 324 and 325 of fingerprints 311, 312, 313, 314 and 315 respectively in the rolled fingerprint frames 301, 302, 303, 304 and 305. The rolled fingerprint acquisition apparatus 100 may calculate the central location of each of the fingerprints 311, 312, 313, 314 and 315 using the center of mass.

Next, the rolled fingerprint acquisition apparatus 100 sets an order in which the reference frame 303 and rolled fingerprint frames 301, 302, 304 and 305 are registered and synthesized, based on the calculated central locations 321, 322, 323, 324 and 325. For example, distances from the central locations 321, 322, 324 and 325 to the central location 323 of the reference frame 303 increase in the order of the first central location 322, the second central location 324, the third central location 321 and the fourth central location 325. In the case of registering the reference frame 303 and rolled fingerprint frames 301, 302, 304 and 305 in such a manner to register a rolled fingerprint frame whose central location is closer to the central location of the reference frame earlier, the rolled fingerprint acquisition apparatus 100 registers and synthesizes the reference frame 303 and the first rolled fingerprint frame 302 including the first central location 322 to create a first synthesized frame 331. Then, the rolled fingerprint acquisition apparatus 100 registers and synthesizes the first synthesized frame 331 with the second rolled fingerprint frame 304 including the second central location 324 to create a second synthesized frame 332. Then, the rolled fingerprint acquisition apparatus 100 registers and synthesizes the second synthesized frame 332 with the third rolled fingerprint frame 301 including the third central location 321 to create a third synthesized frame 333. Next, the rolled fingerprint acquisition apparatus 100 registers and synthesizes the third synthesized frame 333 with the fourth rolled fingerprint frame 305 including the fourth central location 325 to create a fourth synthesized frame 334. A fingerprint included in the fourth synthesized frame 334 is a finally acquired fingerprint.

The current example corresponds to the case where 5 rolled fingerprint frames are acquired, however, the current example does not limit the number of acquired fingerprint frames. That is, the current example may be applied in the same manner to the case where the number of acquired rolled fingerprint frames is more or less than 5.

The rolled fingerprint acquisition apparatus 100 may reduce distortion of a fingerprint by registering and synthesizing a reference frame and rolled fingerprint frames in a manner to register and synthesize the reference frame with a rolled fingerprint frame whose central location is closer to the central location of the reference frame earlier. As a result, the rolled fingerprint acquisition apparatus 100 may acquire an accurate fingerprint.

Figure 4:
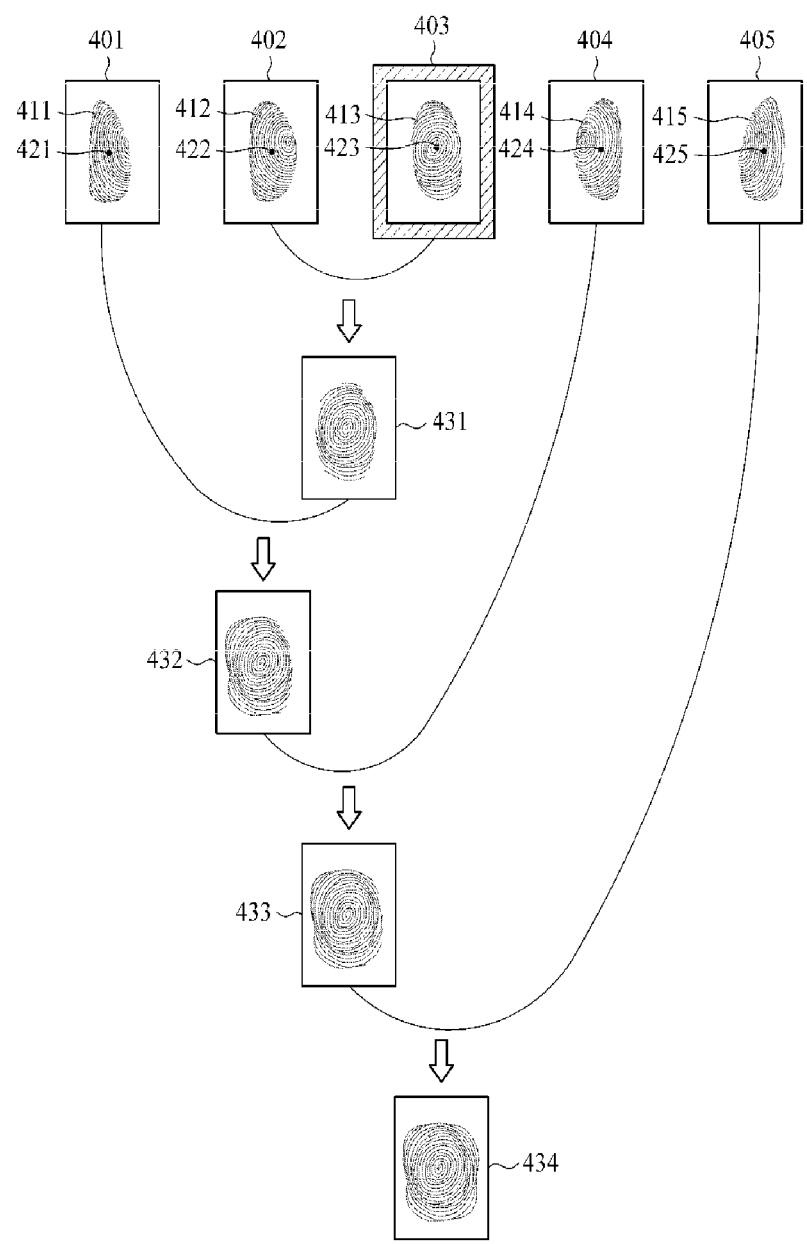
FIG. 4 is a view for explaining another example of the order in which registration and synthesis are performed.

FIG. 4 is a view for explaining another example of the order in which registration and synthesis are performed.

Referring to FIGS. 1 and 4, the rolled fingerprint acquisition apparatus 100 selects a reference frame 403 from among rolled fingerprint frames 401, 402, 403, 404 and 405 that are sequentially acquired by the rolled fingerprint frame acquisition unit 110. For example, the rolled fingerprint acquisition apparatus 100 may select a reference frame 403 using a mean or median value of the central locations of fingerprints included in the rolled fingerprint frames 401, 402, 403, 404 and 405. As another example, the rolled fingerprint acquisition apparatus 100 may select a reference frame using the outline or ridges of a fingerprint. However, the rolled fingerprint acquisition apparatus 100 may select a reference frame using other methods than the above-described methods.

Then, the rolled fingerprint acquisition apparatus 100 calculates the central locations 421, 422, 423, 424 and 425 of fingerprints 411, 412, 413, 414 and 415 respectively in the rolled fingerprint frames 401, 402, 403, 404 and 405. The rolled fingerprint acquisition apparatus 100 may select the central location of each of the fingerprints 411, 412, 413, 414 and 415 using the center of mass.

Next, the rolled fingerprint acquisition apparatus 100 may register and synthesize the reference frame 403 and the rolled fingerprint frames 401 and 402 acquired before the reference frame 403 is acquired in such a manner as to register and synthesize a rolled fingerprint frame whose central location is closer to the central location 423 of the reference frame 403 earlier. Then, the rolled fingerprint acquisition apparatus 100 may register and synthesize the reference frame 403 and the rolled fingerprint frames 404 and 405 acquired after the reference frame 403 is acquired in such a manner as to register and synthesize a fingerprint frame whose central location is closer to the central location 423 of the reference frame 403 earlier.

For example, distances from the first and second central locations 421 and 422 of the rolled fingerprint frames 401 and 402 to the central location 423 of the reference frame increase in the order of the first central location 422 and the second central location 421. Also, distances from the third and fourth central locations 424 and 425 of the rolled fingerprint frames 404 and 405 to the central location 423 of the reference frame 403 increase in the order of the third central location 424 and the fourth central location 425.

Accordingly, the rolled fingerprint acquisition apparatus 100 registers and synthesizes the reference frame 403 with the first rolled fingerprint frame 402 including the first central location 422 to create a first synthesized frame 431. Then, the rolled fingerprint acquisition apparatus 100 registers and synthesizes the first synthesized frame 431 with the second rolled fingerprint frame 401 including the second central location 421 to create a second synthesized frame 432. Next, the rolled fingerprint acquisition apparatus 100 registers and synthesizes the second synthesized frame 432 with the third rolled fingerprint frame 404 including the third central location 424 to create a third synthesized frame 433. Next, the rolled fingerprint acquisition apparatus 100 registers and synthesizes the third synthesized frame 433 with the fourth rolled fingerprint frame 405 including the fourth central location 425 to create a fourth synthesized frame 434. A fingerprint included in the fourth synthesized frame 434 is a finally acquired fingerprint.

Alternatively, the rolled fingerprint acquisition apparatus 100 may register and synthesize the rolled fingerprint frames 404 and 405 acquired after the reference frame 403 is acquired, with the reference frame 403, and thereafter register and synthesize the rolled fingerprint frames 401 and 402 acquired before the reference frame 403 is acquired, with the reference frame 403.

Therefore, the rolled fingerprint acquisition apparatus 100 may acquire a fingerprint whose upper and lower portions have no distortion by performing registration and synthesis between a reference frame and its adjacent rolled fingerprint frames.

Figure 5:
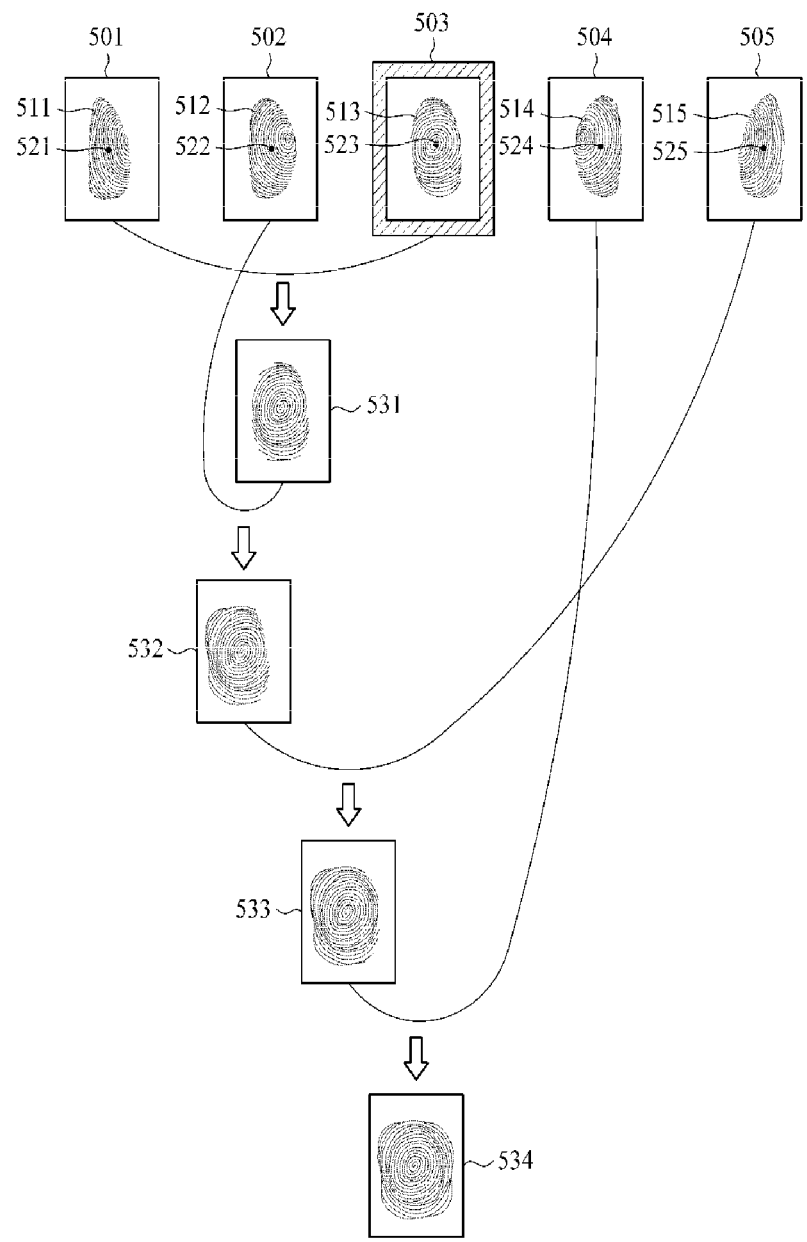
FIG. 5 is a view for explaining another example of the order in which registration and synthesis are performed.

FIG. 5 is a view for explaining another example of the order in which registration and synthesis are performed.

Referring to FIGS. 1 and 5, the rolled fingerprint acquisition apparatus 100 selects a reference frame 503 from among rolled fingerprint frames 501, 502, 503, 504 and 505 that are sequentially acquired by the rolled fingerprint frame acquisition unit 110. For example, the rolled fingerprint acquisition apparatus 100 may select a reference frame 503 using a mean or median value of the central locations 521, 522, 532, 524 and 525 of fingerprints 511, 512, 513, 514 and 515 included in the rolled fingerprint frames 501, 502, 503, 504 and 505. As another example, the rolled fingerprint acquisition apparatus 100 may select a reference frame 593 using the outline or ridges of a fingerprint. However, the rolled fingerprint acquisition apparatus 100 may select a reference frame using other methods than the above-described methods.

Then, the rolled fingerprint acquisition apparatus 100 calculates the central locations 521, 522, 523, 524 and 525 of fingerprints 511, 512, 513, 514 and 515 respectively in the rolled fingerprint frames 501, 502, 503, 504 and 505. The rolled fingerprint acquisition apparatus 100 may select the central location of each of the fingerprints 511, 512, 513, 514 and 515 using the center of mass.

The rolled fingerprint acquisition apparatus 100 may register and synthesize the reference frame 503 and the rolled fingerprint frames 501 and 502 acquired before the reference frame 503 is acquired in such a manner as to register and synthesize a rolled fingerprint frame whose central location is more distant from the central location 523 of the reference frame 503 earlier. Then, the rolled fingerprint acquisition apparatus 100 may register and synthesize the reference frame 503 and the rolled fingerprint frames 504 and 505 acquired after the reference frame 503 is acquired in such a manner as to register and synthesize a rolled fingerprint frame whose central location is more distant from the central location 523 of the reference frame 503 earlier.

For example, distances from the first and second central locations 521 and 522 of the rolled fingerprint frames 501 and 502 to the central location 523 of the reference frame 503 decrease in the order of the first central location 521 and the second central location 522. Also, distances from the third and fourth central locations 524 and 525 of the rolled fingerprint frames 504 and 505 to the central location 523 of the reference frame 503 decrease in the order of the third central location 525 and the fourth central location 524.

Accordingly, the rolled fingerprint acquisition apparatus 100 registers and synthesizes the reference frame 503 with the first rolled fingerprint frame 501 including the first central location 521 to create a first synchronized frame 531. Then, the rolled fingerprint acquisition apparatus 100 registers and synthesizes the first synthesized frame 531 with the second rolled fingerprint frame 502 including the second central location 522 to create a second synthesized frame 532. Next, the rolled fingerprint acquisition apparatus 100 registers and synthesizes the second synthesized frame 532 with the third rolled fingerprint frame 505 including the third central location 525 to create a third synthesized frame 533. Successively, the rolled fingerprint acquisition apparatus 100 registers and synthesizes the third synthesized frame 533 with the fourth rolled fingerprint frame 504 including the fourth central location 524 to create a fourth synthesized frame 534. A fingerprint included in the fourth synthesized frame 534 is a finally acquired fingerprint.

Alternatively, the rolled fingerprint acquisition apparatus 100 may register and synthesize the rolled fingerprint frames 504 and 505 acquired after the reference frame 503 is acquired, with the reference frame 503, and thereafter register and synthesize the rolled fingerprint frames 501 and 502 acquired before the reference frame 503 is acquired, with the reference frame 503.

Figure 6:
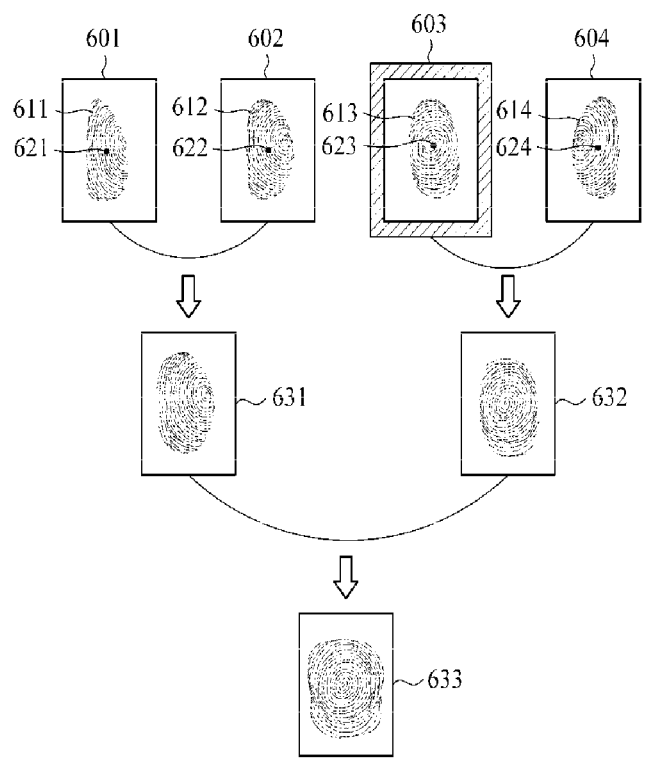
FIG. 6 is a view for explaining another example of the order in which registration and synthesis are performed.

FIG. 6 is a view for explaining another example of the order in which registration and synthesis are performed.

Referring to FIGS. 1 and 6, the rolled fingerprint acquisition apparatus 100 selects a reference frame 603 from among rolled fingerprint frames 601, 602, 603 and 604 that are sequentially acquired by the rolled fingerprint frame acquisition unit 110. For example, the rolled fingerprint acquisition apparatus 100 may select a reference frame 603 using a mean or median value of the central locations 621, 622, 623 and 624 of fingerprints 611, 612, 613 and 614 included in the rolled fingerprint frames 601, 602, 603 and 604. As another example, the rolled fingerprint acquisition apparatus 100 may select a reference frame 603 using the outline or ridges of a fingerprint. However, the rolled fingerprint acquisition apparatus 100 may select a reference frame 603 using other methods than the above-described methods.

Then, the rolled fingerprint acquisition apparatus 100 calculates the central locations 621, 622, 623 and 624 of the fingerprints 611, 612, 613 and 614 respectively in the rolled fingerprint frame 601, 602, 603 and 604. The rolled fingerprint acquisition apparatus 100 may select the central location of each of the fingerprints 611, 612, 613 and 614 using the center of mass.

Referring to FIG. 6, distances from the central locations 621, 622 and 624 of the rolled fingerprint frames 601, 602 and 604 to the central location 623 of the reference frame 603 increase in the order of the first central location 624, the second central location 622 and the third central location 621.

The rolled fingerprint acquisition apparatus 100 registers and synthesizes the reference frame 603 with the first rolled fingerprint frame 604 whose central location 624 is closest to the central location 623 of the reference frame 603 to create a first synthesized frame 632. Then, the rolled fingerprint acquisition apparatus 100 registers and synthesizes the second rolled fingerprint frame 602 whose central location 622 is second closest to the central location 623 of the reference frame 603 with the third rolled fingerprint frame 601 whose central location 621 is third closest to the central location 623 of the reference frame 603 to create a second synthesized frame 631. Next, the rolled fingerprint acquisition apparatus 100 registers and synthesizes the first synthesized frame 632 with the second synthesized frame 631 to create a third synthesized frame 633. A fingerprint included in the third synthesized frame 633 is a finally acquired fingerprint.

Therefore, the rolled fingerprint acquisition apparatus 100 may acquire a fingerprint whose upper and lower portions have no distortion by performing registration and synthesis between a reference frame and its adjacent rolled fingerprint frames.

Figure 7:
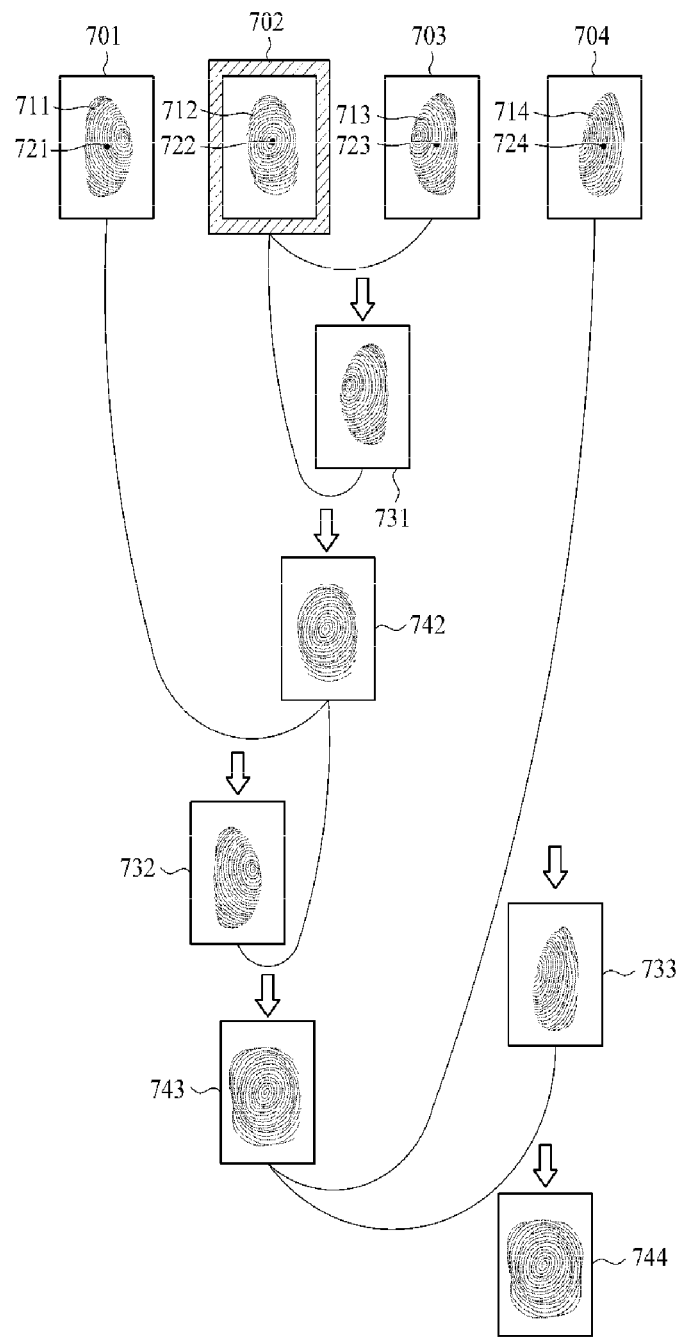
FIG. 7 is a view for explaining in detail the order in which registration and synthesis are performed as illustrated in FIG. 3.

FIG. 7 is a view for explaining in detail the order in which registration and synthesis are performed as illustrated in FIG. 3.

Referring to FIGS. 1 and 7, the rolled fingerprint acquisition apparatus 100 selects a reference frame 702 from among rolled fingerprint frames 701, 702, 703 and 704 that are sequentially acquired by the rolled fingerprint frame acquisition unit 110. For example, the rolled fingerprint acquisition apparatus 100 may select a reference frame 702 using a mean or median value of the central locations 721, 722, 723 and 724 of fingerprints 711, 712, 713 and 714 included in the rolled fingerprint frames 701, 702, 703 and 704. As another example, the rolled fingerprint acquisition apparatus 100 may select a reference frame 702 using the outline or ridges of a fingerprint. However, the rolled fingerprint acquisition apparatus 100 may select a reference frame using other methods than the above-described methods.

Then, the rolled fingerprint acquisition apparatus 100 calculates the central locations 721, 722, 723 and 724 of fingerprints 711, 712, 713 and 714 respectively included in the rolled fingerprint frames 701, 702, 703 and 704. The rolled fingerprint acquisition apparatus 100 may select the central location of each of the fingerprints 711, 712, 713 and 714 using the center of mass.

Then, the rolled fingerprint acquisition apparatus 100 sets an order in which the reference frame 702 and rolled fingerprint frames 701, 703 and 704 are registered and synthesized, based on the calculated central locations 721, 722, 723 and 724. For example, distances from the central locations 721, 723 and 724 of the rolled fingerprint frames 701, 703 and 704 to the central location 722 of the reference frame 702 increase in the order of the first central location 723, the second central location 721 and the third central location 724. In the case of registering and synthesizing the reference frame 702 and rolled fingerprint frames 701, 703 and 704 in such a manner to register and synthesize a rolled fingerprint frame whose central location is closer to the central location 722 of the reference frame 702 earlier, the rolled fingerprint acquisition apparatus 100 registers the first rolled fingerprint frame 703 including the first central location 723 with the reference frame 702 to create a first synthesized frame 731. Since the first synthesized frame 731 is obtained by registering the first rolled fingerprint frame 703 with the reference frame 702, the first synthesized frame 731 will be nearly similar to the first rolled fingerprint frame 703. Details for this will be described with reference to FIG. 9. Then, the rolled fingerprint acquisition apparatus 100 synthesizes the reference frame 702 with the first registered frame 731 to create a first synthesized frame 742. Then, the rolled fingerprint acquisition apparatus 100 registers the second rolled fingerprint frame 701 including the second central location 721 with the first synthesized frame 742 to create a second registered frame 732. Next, the rolled fingerprint acquisition apparatus 100 synthesizes the first synthesized frame 742 with the second registered frame 732 to create a second synthesized frame 743. Successively, the rolled fingerprint acquisition apparatus 100 registers the third rolled fingerprint frame 704 including the third central location 724 with the second synthesized frame 743 to create a third registered frame 733. Finally, the rolled fingerprint acquisition apparatus 100 synthesizes the second synthesized frame 743 with the third registered frame 733 to create a third synthesized frame 744. A fingerprint included in the third synthesized frame 744 is a finally acquired fingerprint.

As another example, when there is a separate synthesized frame for synthesis, the rolled fingerprint acquisition apparatus 100 inserts the reference frame 702 into the synthesized frame. The rolled fingerprint acquisition apparatus 100 registers the first-order rolled fingerprint frame 703 with the synthesized frame to create the first registered frame 731. Then, the rolled fingerprint acquisition apparatus 100 synthesizes the first registered frame 731 with the synthesized frame and again inserts the result of the synthesis into the synthesized frame. The rolled fingerprint acquisition apparatus 100 registers a second-order rolled fingerprint frame 701 with the synthesized frame to create a second registered frame 732. Then, the rolled fingerprint acquisition apparatus 100 synthesizes the second registered frame 732 with the synthesized frame and again inserts the result of the synthesis into the synthesized frame. By repeating the above-described process, the rolled fingerprint acquisition apparatus 100 obtains a finally synthesized frame and a fingerprint included in the finally synthesized frame is a finally acquired fingerprint.

The example illustrated in FIG. 7 may be applied to the examples illustrated in FIGS. 4, 5, and 6.

Therefore, the rolled fingerprint acquisition apparatus 100 may acquire a fingerprint whose upper and lower portions have no distortion by performing registration and synthesis between a reference frame and its adjacent rolled fingerprint frames.

Figure 8:
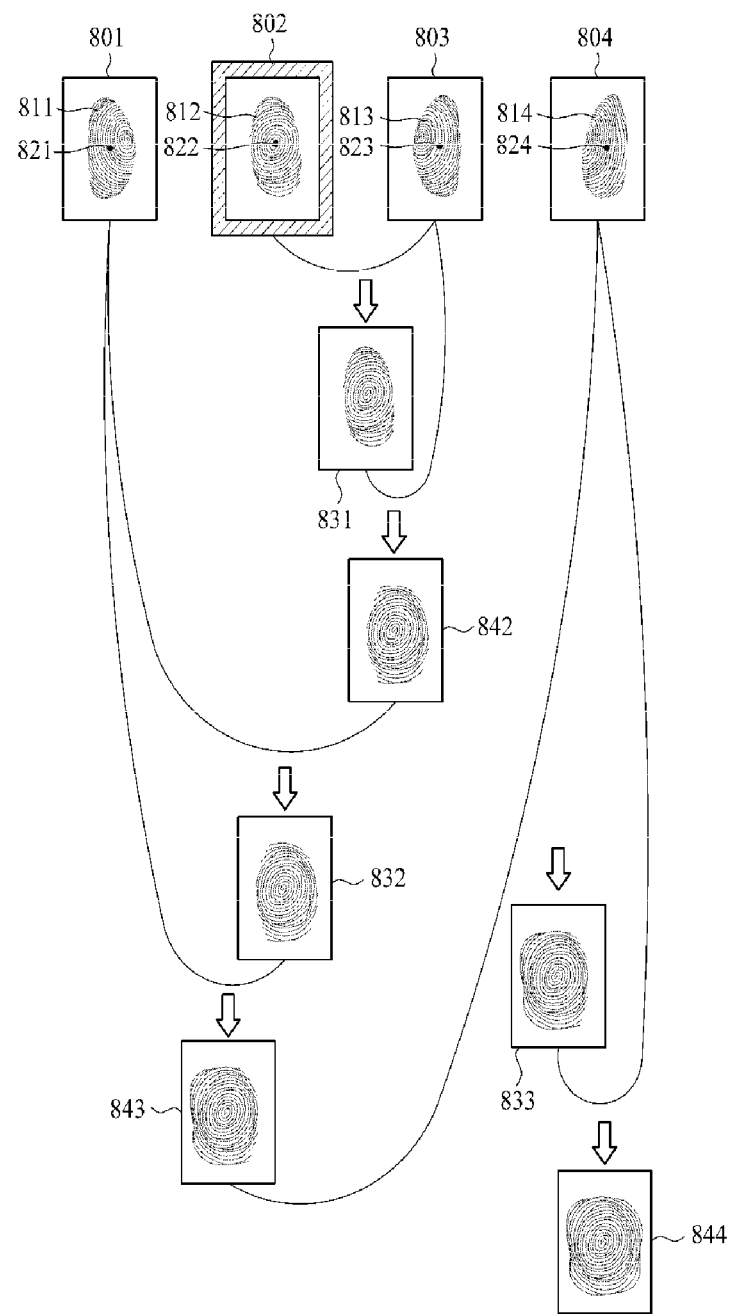
FIG. 8 is another view for explaining in detail the order in which registration and synthesis are performed as illustrated in FIG. 3.

FIG. 8 is another view for explaining in detail the order in which registration and synthesis are performed as illustrated in FIG. 3.

Referring to FIGS. 1 and 8, the rolled fingerprint acquisition apparatus 100 selects a reference frame 802 from among rolled fingerprint frames 801, 802, 803 and 804 acquired sequentially through the rolled fingerprint frame acquisition unit 110. For example, the rolled fingerprint acquisition apparatus 100 may select a reference frame 802 using a mean or median value of the central locations 821, 822, 823 and 824 of fingerprints 811, 812, 813 and 814 included in the rolled fingerprint frames 801, 802, 803 and 804. As another example, the rolled fingerprint acquisition apparatus 100 may select a reference frame 802 using the outline or ridges of a fingerprint. However, the rolled fingerprint acquisition apparatus 100 may select a reference frame using other methods than the above-described methods.

The rolled fingerprint acquisition apparatus 100 calculates the central locations 821, 822, 823 and 824 of the fingerprints 811, 812, 813 and 814 included in the rolled fingerprint frames 801, 802, 803 and 804. The rolled fingerprint acquisition apparatus 100 may calculate the central locations 821, 822, 823 and 824 of the fingerprints 811, 812, 813 using the center of mass.

The rolled fingerprint acquisition apparatus 100 may set an order in which registration and synthesis are performed between the reference frame 802 and rolled fingerprint frames 801, 803 and 804 based on the central locations 821, 822, 823 and 824. For example, the distances between the central location 822 of the reference frame 802 and the central locations 821, 823 and 824 increase in the order of the first central location 823, the second central location 821 and the third central location 824. The rolled fingerprint acquisition apparatus 100 may set an order in which registration and synthesis are performed in such a manner as to register and synthesize a rolled fingerprint frame whose central location is closer to the central location 822 of the reference frame 802 earlier. In this case, the rolled fingerprint acquisition apparatus 100 registers the reference frame 802 with the first rolled fingerprint frame 803 including the first central location 823 to create a first registered frame 831. Since the first registered frame 831 is created by registering the reference frame 802 with the first rolled fingerprint frame 803, the first registered frame 831 will be nearly similar to the reference frame 802. Details for this will be described later with reference to FIG. 9. Then, the rolled fingerprint acquisition apparatus 100 synthesizes the first rolled fingerprint frame 803 with the first registered frame 831 to create a first synthesized frame 842. Next, the rolled fingerprint acquisition apparatus 100 registers the first synthesized frame 842 with the second rolled fingerprint frame 801 including the second central location 821 to create a second registered frame 832. Successively, the rolled fingerprint acquisition apparatus 100 synthesizes the second rolled fingerprint frame 801 with the second registered frame 832 to create a second synthesized frame 843. Then, the rolled fingerprint acquisition apparatus 100 registers the second synthesized frame 843 with the third rolled fingerprint frame 804 including the third central location 824 to create a third registered frame 833. Finally, the rolled fingerprint acquisition apparatus 100 synthesizes the third rolled fingerprint frame 804 with the third registered frame 833 to create a third synthesized frame 844. A fingerprint included in the third synthesized frame 844 is a finally acquired fingerprint.

The example illustrated in FIG. 8 may be applied to the examples illustrated in FIGS. 4, 5, and 6.

Therefore, the rolled fingerprint acquisition apparatus 100 may acquire a fingerprint whose upper and lower portions have no distortion by performing registration and synthesis between a reference frame and its adjacent rolled fingerprint frames.

Figure 9:
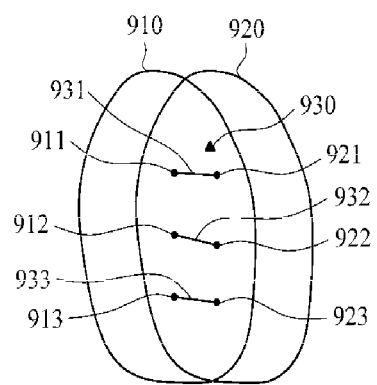
FIG. 9 is a view for explaining an example of a registration method.

FIG. 9 is a view for explaining an example of a registration method.

Referring to FIGS. 1 and 9, the registration/synthesis unit 150 extracts a foreground 910 of a reference frame and a foreground 920 of a rolled fingerprint frame to be registered with the reference frame. The registration/synthesis unit 150 correlates the foreground 910 of the reference frame to the foreground 920 of the rolled fingerprint frame to be registered with the reference frame. For example, it is possible to correlate the foreground 910 of the reference frame with the foreground 920 of the rolled fingerprint frame to be registered with the reference frame by overlapping the reference frame with the rolled fingerprint frame. As another example, the registration/synthesis unit 150 may correlate the foreground 910 of the reference frame to the foreground 920 of the rolled fingerprint frame by matching the end point, diverged portions, central point, etc. of a fingerprint included in the foreground 910 with the corresponding ones of the foreground 920, respectively.

The registration/synthesis unit 150 extracts a region 930 in which the foreground 910 of the reference frame overlaps the foreground 920 of the rolled fingerprint frame to be registered with the reference frame. Hereinafter, the case where the registration/synthesis unit 150 matches the foreground 920 of the rolled fingerprint frame with the foreground 910 of the reference frame will be described.

The registration/synthesis unit 150 sets one or more control points 921, 922 and 923 in the overlapping regions 930. That is, the control points 921, 922 and 923 are points that are in the foreground 920 of the rolled fingerprint frame. Then, the registration/synthesis unit 150 calculates displacements 931, 932 and 933 from the control points 921, 922 and 923 to points 911, 912 and 923 that are in the foreground 910 of the reference frame and match the control points 921, 922 and 923. For example, the points 911, 912 and 923 on the foreground 910 of the reference frame, matching the control points 921, 922 and 923, may be identified based on the intensity value of the corresponding fingerprint.

For example, the registration/synthesis unit 150 may calculate matching scores to which degrees of sameness or similarity between each control point and individual points on the reference frame are scored, and recognize a point having a greatest matching score as a point matching the control point. The matching scores may be calculated by comparing the intensity value of the control point with the intensity value of each point of the reference frame. Alternatively, the matching scores may be calculated by comparing the intensity value of a block including the control point with the intensity value of each block of the reference frame.

As another example, the registration/synthesis unit 150 may calculate displacements based on displacements calculated with respect to another control point. For example, the case where a displacement calculated based on a first control point is "2," two points having a greatest matching score with respect to a second control point are found and displacements of the two points are respectively "1" and "10" will be explained. The registration/synthesis unit 150 may select a displacement having the smaller difference from the displacements calculated with respect to the first control point, from among the displacements 1 and 10 calculated with respect to the second control point. The current example corresponds to the case where two control points are set, however, the current example does not limit the number of acquired fingerprint frames. In this way, errors of wrongly calculating displacements may be reduced.

The registration/synthesis unit 150 registers the rolled fingerprint frame with the reference frame based on the calculated displacements. For example, the registration/synthesis unit 150 moves all pixels of the rolled fingerprint frame based on the calculated displacements, thereby registering the rolled fingerprint frame with the reference frame. The registration/synthesis unit 150 may determine values for moving the pixels by interpolating displacements of pixels adjacent to the pixels.

As another example, the case where the registration/synthesis unit 150 registers the reference frame with the rolled fingerprint frame will be described below. In this case, the registration/synthesis unit 150 extracts a region 930 where the foreground 910 of the reference frame overlaps the foreground 920 of the rolled fingerprint frame. Then, the registration/synthesis unit 150 sets one or more control points 911, 912 and 913 in the overlapping regions 930. That is, the control points 911, 912 and 913 are points that are in the foreground 910 of the reference frame. Then, the registration/synthesis unit 150 calculates displacements 931, 932 and 933 from the control points 911, 912 and 913 to points 921, 922 and 923 that are in the foreground 920 of the rolled fingerprint frame and match the control points 911, 912 and 913.

Then, the registration/synthesis unit 150 registers the reference frame with the rolled fingerprint frame based on the calculated displacements 931, 932 and 933. For example, the registration/synthesis unit 150 may move all pixels of the reference frame based on the calculated displacements 931, 932 and 933, thereby registering the reference frame with the rolled fingerprint frame. The registration/synthesis unit 150 may determine values for moving the pixels by interpolating displacements of pixels adjacent to the pixels.

In this way, the rolled fingerprint acquisition method using registration and synthesis may accurately register two fingerprints.

Figure 10:
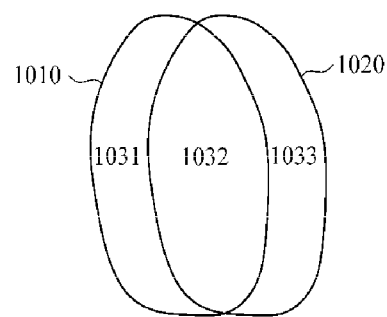
FIG. 10 is a view for explaining an example of a synthesis method.

FIG. 10 is a view for explaining an example of a synthesis method.

Referring to FIGS. 1, 7 and 10, the registration/synthesis unit 150 extracts a first foreground 1010 from a reference frame 702 and a second foreground 1020 from a first registered frame 731. The registration/synthesis unit 150 correlates the reference frame 702 with the first registered frame 731. The resultant foreground includes a first region 1031, a second region 1032 and a third region 1033.

Then, the registration/synthesis unit 150 compares the intensity value of each pixel of the first foreground 1010 belonging to the second region 1032 where the first foreground 1010 overlaps the second foreground 1020, with the intensity value of the corresponding pixel of the second foreground 1020 belonging to the second region 1032, to set the intensity value of each pixel. For example, the registration/synthesis unit 150 may select an intensity value having a darker color between the intensity value of the first foreground 1010 and the intensity value of the second foreground 1020 and set the selected intensity value as an intensity value.

The registration/synthesis unit 150 performs the above-described process on all pixels included in the second region 1032. By setting each pixel included in the second region 1032 to have a darker color between the intensity values of the corresponding pixels in the first and second foreground 1010 and 1020, a fingerprint included in the second region 1032 may be clearly represented.

As another example, the registration/synthesis unit 150 may set a mean value of the intensity value of each pixel of the first foreground 1010 and the intensity value of the corresponding pixel of the second foreground 1020, as an intensity value of the pixel.

As another example, the registration/synthesis unit 150 assigns a weight to either one of the intensity value of each pixel of the first foreground 1010 and the intensity value of the corresponding pixel of the second foreground 1020 to calculate an intensity value, and sets the calculated intensity value as an intensity value of the pixel.

The registration/synthesis unit 150 maintains the intensity values of pixels in the remaining portions of the first and second foregrounds 1020, not belonging to the second region 1032 where the first foreground 1010 overlaps the second foreground 1020. For example, the registration/synthesis unit 150 may set the intensity value of the first region 1031 to the intensity value of the first synthesized frame 742 (see FIG. 7) and the intensity value of the third region 1033 to the intensity value of the second registered frame 732.

However, the registration/synthesis unit 150 may synthesize two fingerprints using other methods than the above-described example.

The above-described methods may be implemented as codes readable by a processor in a medium in which programs are recorded. The medium may be ROM, RAM, CD-ROM, a magnetic tape, a floppy disk or optical data storage, or may be implemented in the form of carrier waves (for example, transmission through the Internet).

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A rolled fingerprint acquisition method using registration and synthesis, comprising:
    selecting, using a selector, a reference frame from among rolled fingerprint frames that are sequentially acquired;
    calculating, using a calculator, central locations of fingerprints included in the rolled fingerprint frames;
    setting, using a registration and synthesis order setting unit, an order in which the reference frame and the rolled fingerprint frames are registered and synthesized, based on the distances between the central location of the reference frame and the rolled fingerprint frames; and
    registering and synthesizing, using a registration/synthesis unit, the reference frame and the rolled fingerprint frames according to the set order.

2. The rolled fingerprint acquisition method of claim 1, wherein the selecting of the reference frame comprises:
    calculating a mean or median value of the central locations of the fingerprints included in the rolled fingerprint frames; and
    selecting a rolled fingerprint frame whose central location value is closest to the mean or median value, as the reference frame, from among the rolled fingerprint frames.

3. The rolled fingerprint acquisition method of claim 1, wherein the selecting of the reference frame comprises selecting a rolled fingerprint frame in which the outline or ridges of a fingerprint has a symmetrical structure, as the reference frame, from among the rolled fingerprint frames.

4. The rolled fingerprint acquisition method of claim 1, wherein the selecting of the reference frame comprises selecting a rolled fingerprint frame whose central location is closest from a core of a fingerprint, as the reference frame, from among the rolled fingerprint frames.

5. The rolled fingerprint acquisition method of claim 1, wherein the calculating of the central locations of the fingerprints included in the rolled fingerprint frames comprises:
    calculating a center of mass using weights of the pixels and the coordinate values of the pixels; and
    setting the center of mass as a central location of the rolled fingerprint frame.

6. The rolled fingerprint acquisition method of claim 1, wherein the setting of the order in which the reference frame and the rolled fingerprint frames are registered and synthesized comprises:
    setting the order in which the reference frame and the rolled fingerprint frames are registered and synthesized in such a manner as to register and synthesize a rolled fingerprint frame whose central location is closer to the central location of the reference frame earlier.

7. The rolled fingerprint acquisition method of claim 1, wherein the setting of the order in which the reference frame and the rolled fingerprint frames are registered and synthesized comprises:
    setting the order in which the reference frame and rolled fingerprint frames acquired before the reference frame is acquired among the rolled fingerprint frames are registered and synthesized, in such a manner as to register and synthesize a rolled fingerprint frame whose central location is closer to the central location of the reference frame earlier, among the rolled fingerprint frames; and
    setting the order in which the reference frame and rolled fingerprint frames acquired after the reference frame is acquired among the rolled fingerprint frames are registered and synthesized, in such a manner as to register and synthesize a rolled fingerprint frame whose central location is closer to the central location of the reference frame earlier, among the rolled fingerprint frames.

8. The rolled fingerprint acquisition method of claim 1, wherein the setting of the order in which the reference frame and the rolled fingerprint frames are registered and synthesized comprises:
    setting an order in which the reference frame and rolled fingerprint frames acquired before the reference frame is acquired among the rolled fingerprint frames are registered and synthesized, in such a manner as to register and synthesize a rolled fingerprint frame whose central location is more distant from the central location of the reference frame earlier, among the rolled fingerprint frames; and
    setting an order in which the reference frame and rolled fingerprint frames acquired after the reference frame is acquired among the rolled fingerprint frames are registered and synthesized, in such a manner as to register and synthesize a rolled fingerprint frame whose central location is more distant from the central location of the reference frame earlier, among the rolled fingerprint frames.

9. The rolled fingerprint acquisition method of claim 1, wherein the setting of the order in which the reference frame and the rolled fingerprint frames are registered and synthesized comprises registering and synthesizing the reference frame with a first rolled fingerprint frame whose central location is closest to the central location of the reference frame to create a first synthesized frame, registering and synthesizing a second rolled fingerprint frame whose central location is second closest to the central location of the reference frame with a third rolled fingerprint frame whose central location is third closest to the central location of the reference frame to create a second synthesized frame, and registering and synthesizing the first synthesized frame with the second synthesized frame to create a third synthesized frame.

10. The rolled fingerprint acquisition method of claim 1, wherein the registering and synthesizing of the reference frame and the rolled fingerprint frames comprises:
    registering a rolled fingerprint frame that is at a first order, with the reference frame to create a first registered frame;
    synthesizing the reference frame with the first registered frame to create a first synthesized frame;
    registering a rolled fingerprint frame which is at a second order with the first synthesized frame to create a second registered frame; and
    synthesizing the first synthesized frame with the second registered frame to create a second synthesized frame.

11. The rolled fingerprint acquisition method of claim 1, wherein the registering and synthesizing of the reference frame and the rolled fingerprint frames comprises:
- registering the reference frame with a rolled fingerprint frame which is at a first order to create a first registered frame;
- synthesizing the rolled fingerprint frame which is at the first order, with the first registered frame to create a first synthesized frame;
- registering the first synthesized frame with a rolled fingerprint frame which is at a second order, to create a second registered frame; and
- synthesizing the rolled fingerprint frame which is at the second order, with the second registered frame to create a second synthesized frame.

12. The rolled fingerprint acquisition method of claim 1, wherein the registering and synthesizing of the reference frame and the rolled fingerprint frames comprises:
- extracting a foreground of the reference frame and a foreground of the rolled fingerprint frame;
- extracting a region where the foreground of the reference frame overlaps the foreground of the rolled fingerprint frame;
- setting at least one control point in the region where the foreground of the reference frame overlaps the foreground of the rolled fingerprint frame;
- calculating a displacement from the control point to a point that is on the foreground of the reference frame and matches the control point; and
- registering the rolled fingerprint frame with the reference frame based on the displacement.

13. The rolled fingerprint acquisition method of claim 12, wherein the calculating of the displacement comprises finding the point of the reference frame that matches the control point, using an intensity value of the control point or intensity values of pixels included in a block including the control point.

14. The rolled fingerprint acquisition method of claim 12, wherein the calculating of the displacement comprises calculating a displacement from the control point to the point that is on the foreground of the reference frame and matches the control point, based on displacements calculated with respect to another control point.

15. The rolled fingerprint acquisition method of claim 1, wherein the registering and synthesizing of the reference frame and the rolled fingerprint frames comprises:
- extracting foregrounds of two frames to be synthesized with each other; and
- setting at least one of an intensity value of each pixel in a region where the foregrounds overlap to an intensity value having a darker color between intensity values of pixels respectively corresponding to the two foregrounds, the intensity value of each pixel in the region where the foregrounds overlap to a mean value of the intensity values of the pixels respectively corresponding to the foregrounds, and the intensity value of each pixel in the region where the foregrounds overlap to values obtained by assigning weights to the intensity values of the pixels respectively corresponding to the foregrounds.

16. A rolled fingerprint acquisition apparatus comprising:
- a reference frame selector to select a reference frame from among rolled fingerprint frames;
- a central location calculator to calculate central locations of fingerprints included in the rolled fingerprint frames;
- a registration and synthesis order setting unit to set an order in which the reference frame and the rolled fingerprint frames are registered and synthesized, based on the distances between the central location of the reference frame and the rolled fingerprint frames; and
- a registration/synthesis unit to register and synthesize the reference frame and the rolled fingerprint frames according to the set order.

17. The rolled fingerprint acquisition apparatus of claim 16, wherein the central location calculator calculates a center of mass using weights of the pixels and the coordinate values of the pixels, and sets the center of mass as a central location of the rolled fingerprint frame.

18. The rolled fingerprint acquisition apparatus of claim 16, wherein the reference frame selector calculates a mean or median value of central locations of fingerprints included in the rolled fingerprint frames, and selects a rolled fingerprint frame whose central location corresponds to the mean value or is closest to the median value, as a reference frame, among the rolled fingerprint frames.

19. The rolled fingerprint acquisition apparatus of claim 16, wherein the registration and synthesis order setting unit sets the order in which the reference frame and the rolled fingerprint frames are registered and synthesized, in such a manner as to register and synthesize a rolled fingerprint frame whose central location is closer to the central location of the reference frame earlier, among the rolled fingerprint frames.

20. The rolled fingerprint acquisition apparatus of claim 16, wherein the registration/synthesis unit extracts a foreground of the reference frame and a foreground of the rolled fingerprint frame, extracts a region where the foreground of the reference frame overlaps the foreground of the rolled fingerprint frame, sets at least one control point in the region where the foreground of the reference frame overlaps the foreground of the rolled fingerprint frame, calculates a displacement from the control point to a point that is on the foreground of the reference frame and matches the control point, and registers the rolled fingerprint frame with the reference frame based on the displacement.

21. The rolled fingerprint acquisition apparatus of claim 16, wherein the registration/synthesis unit extracts foregrounds of two frames to be synthesized with each other, and
- sets an intensity value of each pixel in a region where the foregrounds overlap to an intensity value having a darker intensity value between intensity values of pixels respectively corresponding to the foregrounds, the intensity value of each pixel in the region where the foregrounds overlap to a mean value of the intensity values of the pixels respectively corresponding to the foregrounds, and the intensity value of each pixel in the region where the foregrounds overlap to values obtained by assigning weights to the intensity values of the pixels respectively corresponding to the foregrounds.

22. A rolled fingerprint acquisition method comprising:
- selecting a rolled fingerprint frame which is first acquired, as a reference frame; and
- sequentially registering and synthesizing the reference frame and rolled fingerprint frames that are acquired after the reference frame is acquired, extracting a foreground of the reference frame and a foreground of a rolled fingerprint frame among the rolled fingerprint frames, extracting a region where the foreground of the reference frame overlaps the foreground of the rolled fingerprint frame, setting at least one control point in the region where the foreground of the reference frame overlaps the foreground of the rolled fingerprint frame, calculating a displacement from the control point to a point that is on the foreground of the reference frame and matches the control point, and registering the rolled fingerprint frame with the reference frame based on the displacement.

* * * * *